United States Patent [19]
Hino

[11] Patent Number: 6,111,771
[45] Date of Patent: Aug. 29, 2000

[54] POWER-CONVERSION APPARATUS

[75] Inventor: Koji Hino, Chiba, Japan

[73] Assignee: Fuji Electric Co., Ltd., Kawasaki, Japan

[21] Appl. No.: 09/406,146

[22] Filed: Sep. 27, 1999

[30] Foreign Application Priority Data

Oct. 1, 1998 [JP] Japan .................................. 10-279950

[51] Int. Cl.$^7$ ..................................................... H02M 1/00

[52] U.S. Cl. ............................. 363/144; 363/40; 363/137

[58] Field of Search .................................... 363/144, 132, 363/40, 136, 137; 257/734

[56] References Cited

U.S. PATENT DOCUMENTS

| | | | |
|---|---|---|---|
| 4,458,305 | 7/1984 | Buckle et al. | 363/141 |
| 5,038,194 | 8/1991 | Takahama | 257/773 |
| 5,172,310 | 12/1992 | Deam et al. | 363/144 |

*Primary Examiner*—Shawn Riley
*Attorney, Agent, or Firm*—Kaensaka & Takeuchi

[57] ABSTRACT

In a bridge circuit, Thyristers for each arm are arranged on the respective surfaces of each DC-side buses, and intervals, at an AC side of a bridge circuit, of connection conductors in the same arm are made equal in order to substantially equalize the mutual inductances between the connection conductors, thereby balancing current shares while currents flowing through the conductors are temporally varying.

10 Claims, 7 Drawing Sheets

POWER-CONVERSION APPARATUS

BACKGROUND OF THE INVENTION AND RELATED ART STATEMENT

The present invention relates to a power-conversion apparatus comprising a bridge circuit, each arm of which has multiple semiconductor devices connected in parallel, and in particular to a power-conversion apparatus that improves the balance of the current share of each semiconductor device.

Figure 6:
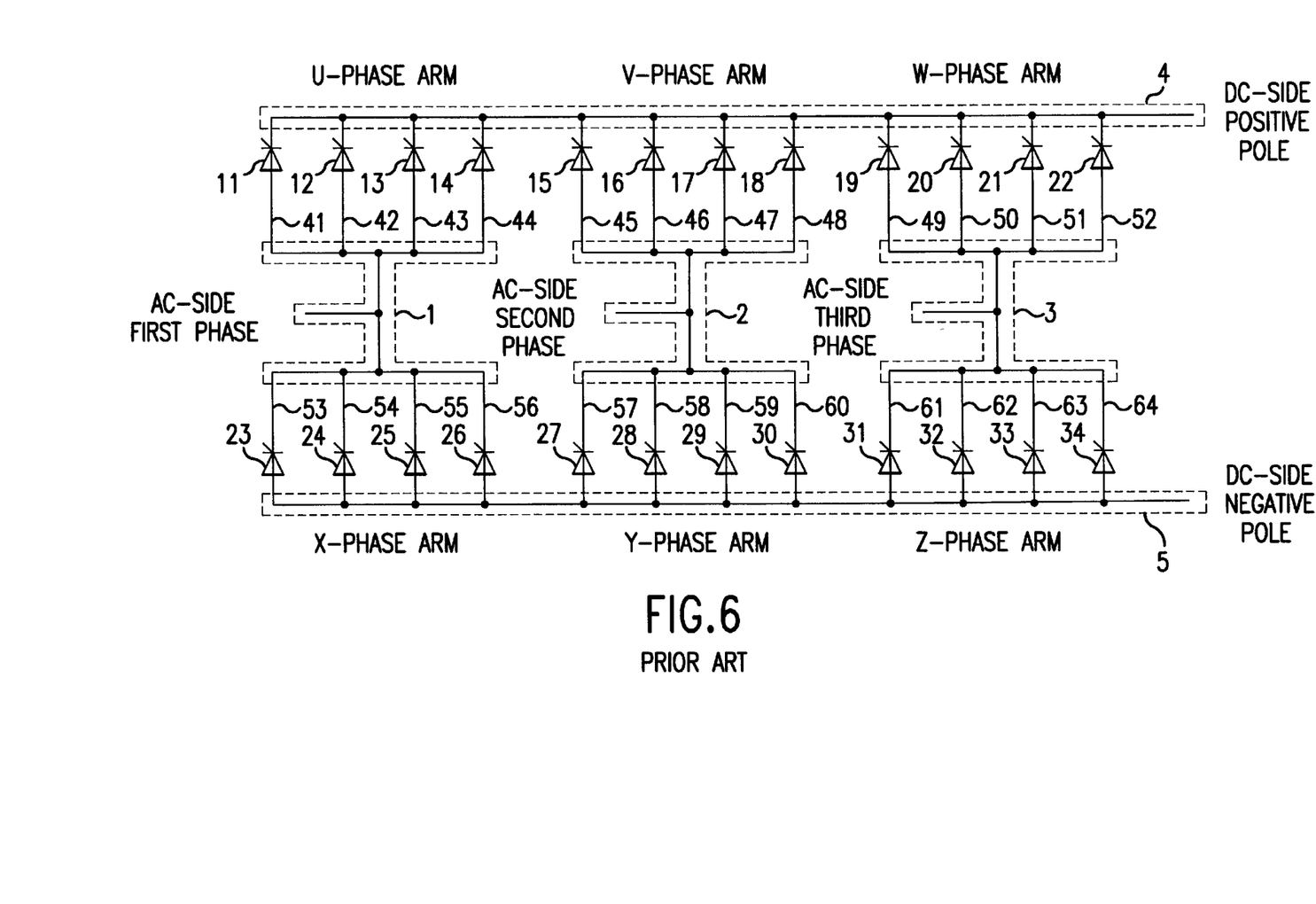
FIG. 6 is a conventional circuit connection diagram of a rectifier used as a power-conversion apparatus of this kind.

FIG. 6 shows a connection diagram of a main circuit of a rectifier used for an electrolytic cell facility as a power-conversion apparatus.

In FIG. 6, 1 indicates a bus for an AC-side first phase, 2 indicates a bus for an AC-side second phase, 3 indicates a bus for an AC-side third phase, 4 indicates a bus for a DC-side positive pole, 5 indicates a bus for a DC-side negative pole, 11 to 34 indicate Thyristors used as semiconductor devices, and 41 to 64 indicate connection conductors extending from one of the buses 1 to 3 to the Thyristors 11 to 34. In a main circuit of this rectifier, the Thyristors 11 to 14 are connected in parallel so as to form a U-phase arm, the Thyristors 15 to 18 are connected in parallel so as to form a V-phase arm, the Thyristors 19 to 22 are connected in parallel so as to form a W-phase arm, the Thyristors 23 to 26 are connected in parallel so as to form a X-phase arm, the Thyristors 27 to 30 are connected in parallel so as to form a Y-phase arm, and the Thyristors 31 to 34 are connected in parallel so as to form a Z-phase arm. The entire apparatus is composed as a three-phase bridge circuit by arranging the U- to W-phase arms as, for example, an upper arm, while arranging the X- to Z-phase arms as, for example, a lower arm.

Figure 7A:
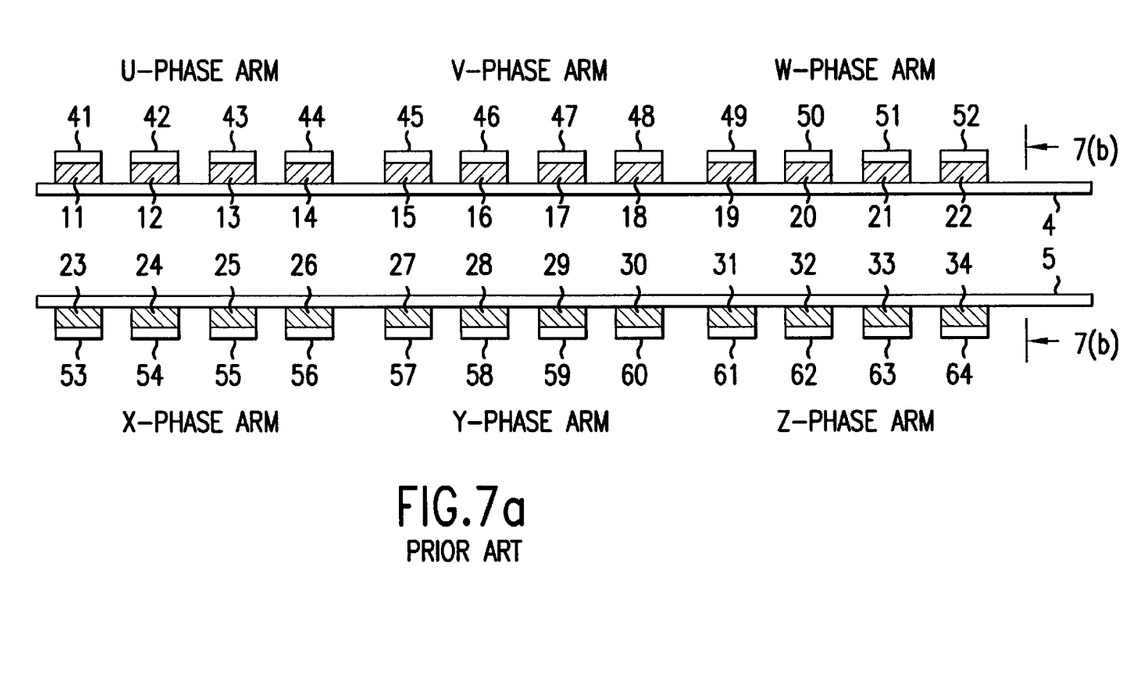
FIG. 7(a) is typical conceptual block diagram of a power-conversion apparatus showing a conventional example.
Figure 7B:
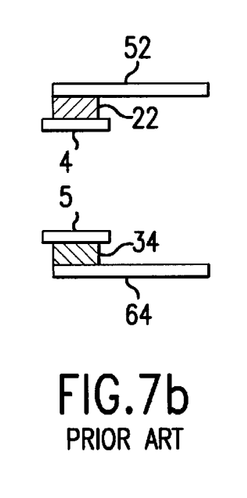
FIG. 7(b) is a cross sectional view taken along line 7(b)—7(b) in FIG. 7(a).

FIGS. 7(a) and 7(b) are typical conceptual diagrams showing a conventional example of the main circuit of the rectifier shown in FIG. 6, wherein the Thyristors 11 to 34 have flat structures.

In the configuration shown in FIGS. 7(a) and 7(b), cathodes of the Thyristors 11 to 22 of each of the U- to W-phase arms contact one surface of the bus 4 for the DC-side positive pole, and anodes of the Thyristors 11 to 22 are connected to one of buses 1 to 3 (not shown) via the connection conductors 41 to 52. In addition, anodes of the Thyristors 23 to 34 of each of the X- to Z-phase arms contact one surface of a bus 5 for the DC-side negative pole that forms the back of the surface positioned opposite to the bus 4 for the DC-side positive pole, and cathodes of the Thyristors 23 to 34 are connected to one of buses 1 to 3 (not shown) via the connection conductors 53 to 64. As shown in FIG. 7(a), the Thyristors 11 to 22 are linearly arranged on one surface of the bus 4, while the Thyristors 23 to 34 are linearly arranged on one surface of the bus 5.

In the configuration shown in FIG. 7(a), when a current begins to flow through, for example, the U-phase arm, a voltage drop occurs across the connection conductors 41 to 44, as shown in Equations (1) to (4).

In each of Equations (1) to (12), the subscripts indicate the connection conductors 41 to 64 and the intermediate positions between the conductors.

Equation 1

$$V_{41}=R_{41} \cdot i_{41}+L_{41} \cdot di_{41}/dt+ M_{41\text{-}42} \cdot di_{42}/dt+M_{41\text{-}43} \cdot di_{43}/dt+M_{41\text{-}44} \cdot di_{44}/dt \quad (1)$$

Equation 2

$$V_{42}=R_{42} \cdot i_{42}+L_{42} \cdot di_{42}/dt+M_{41\text{-}42} \cdot di_{41}/dt+M_{42\text{-}43} \cdot di_{43}/dt+M_{42\text{-}44} \cdot di_{44}/dt \quad (2)$$

Equation 3

$$V_{43}=R_{43} \cdot i_{43}+L_{43} \cdot di_{43}/dt+M_{41\text{-}43} \cdot di_{41}/dt+M_{42\text{-}43} \cdot di_{42}/dt+M_{43\text{-}44} \cdot di_{44}/dt \quad (3)$$

Equation 4

$$V_{44}=R_{44} \cdot i_{44}+L_{44} \cdot di_{44}/dt+M_{41\text{-}44} \cdot di_{41}/dt+M_{42\text{-}44} \cdot di_{42}/dt+M_{43\text{-}44} \cdot di_{43}/dt \quad (4)$$

In Equations (1) to (4), V indicates voltage, R indicates resistance, (i) indicates current, L indicates self-inductance, M indicates mutual inductance, and di/dt indicates a degree of temporal change in the current (i).

In Equations (1) to (4), if the variations in the forward voltage drops of the Thyristors 11 to 14 of the U-phase arm and the variations in the characteristic constants of the connection conductors 41 to 44 are ignored, the voltage drops V41 to V44 are equal across the connection conductors 41 to 44.

In the configuration shown in FIG. 7(a), however, the mutual inductances M between the connection conductors 41 to 44 are inversely proportional to the distance between the conductors. Thus, in Equations (1) to (4), currents $i_{41}$, $i_{44}$ flowing through the connection conductors 41, 44 are larger than currents $i_{42}$, $i_{43}$ flowing through the connection conductors 42, 43. Consequently, currents flowing through the Thyristors 11, 14 are larger than currents flowing through the Thyristors 12, 13. These differences occur while each current is temporally varying (di/dt≠0).

In addition, in the configuration shown in FIG. 7(a), while a current is flowing through, for example, the Y-phase arm, if a current begins to flow through the U-phase arm in the opposite direction relative to the Y-phase arm, the voltage drops shown in Equations (5) to (8) occur across the connection conductors 41 to 44.

Equation 5

$$V_{41}=R_{41} \cdot i_{41}+L_{41} \cdot di_{41}/dt-M_{41\text{-}57} \cdot di_{57}/dt-M_{41\text{-}58} \cdot di_{58}/dt-M_{41\text{-}59} \cdot di_{59}/dt-M_{41\text{-}60} \cdot di_{60}/dt \quad (5)$$

Equation 6

$$V_{42}=R_{42} \cdot i_{42}+L_{42} \cdot di_{42}/dt-M_{42\text{-}57} \cdot di_{57}/dt-M_{42\text{-}58} \cdot di_{58}/dt-M_{42\text{-}59} \cdot di_{59}/dt-M_{42\text{-}60} \cdot di_{60}/dt \quad (6)$$

Equation 7

$$V_{43}=R_{43} \cdot i_{43}+L_{43} \cdot di_{43}/dt-M_{43\text{-}57} \cdot di_{57}/dt-M_{43\text{-}58} \cdot di_{58}/dt-M_{43\text{-}59} \cdot di_{59}/dt-M_{43\text{-}60} \cdot di_{60}/dt \quad (7)$$

Equation 8

$$V_{44}=R_{44} \cdot i_{44}+L_{44} \cdot di_{44}/dt-M_{44\text{-}57} \cdot di_{57}/dt-M_{44\text{-}58} \cdot di_{58}/dt-M_{44\text{-}59} \cdot di_{59}/dt-M_{44\text{-}60} \cdot di_{60}/dt \quad (8)$$

In Equations (5) to (8), V indicates voltage, R indicates resistance, (i) indicates current, L indicates self-inductance, M indicates mutual inductance, and di/dt indicates a degree of temporal change in current (i).

In Equations (5) to (8), if the variations in the edgewise voltages in the Thyristors 11 to 14 of the U-phase arm and the variations in the characteristic constants of the connection conductors 41 to 44 are ignored, the voltage drops V41 to V44 are equal across the connection conductors 41 to 44.

In the configuration shown in FIG. 7(a), however, the mutual inductance M between each of the connection conductors 41 to 44 and each of the connection conductors 57 to 60 is inversely proportional to the distance between the conductors. Thus, in Equations (5) to (8), current $i_{44}$ flowing through the connection conductor 44 is larger than currents $i_{41}$, $i_{42}$, $i_{43}$ flowing through the connection conductors 41 to 43. Consequently, the current flowing through the Thyrister 14 is larger than the currents flowing through the Thyristers 11 to 13. These differences occur while each current is temporally varying ($di/dt \neq 0$).

In addition, in the configuration shown in FIG. 7(a), while a current is flowing through, for example, the U-phase arm, and the current through the Y-phase arm is commuted to the current through the Z-phase arm, the voltage drops shown in Equations (9) to (12) occur across the connection conductors 41 to 44.

Equation 9

$$V_{41} = R_{41} \cdot i_{41} + L_{41} \cdot di_{41}/dt + M_{41\text{-}57} \cdot di_{57}/dt + M_{41\text{-}58} \cdot di_{58}/dt + M_{41\text{-}59} \cdot di_{59}/dt + M_{41\text{-}60} \cdot di_{60}/dt - M_{41\text{-}61} \cdot di_{61}/dt - M_{41\text{-}62} \cdot di_{62}/dt - M_{41\text{-}63} \cdot di_{63}/dt - M_{41\text{-}64} \cdot di_{64}/dt \quad (9)$$

Equation 10

$$V_{42} = R_{42} \cdot i_{42} + L_{42} \cdot di_{42}/dt +$$

$$M_{42\text{-}57} \cdot di_{57}/dt + M_{42\text{-}58} \cdot di_{58}/dt +$$

$$M_{42\text{-}59} \cdot di_{59}/dt + M_{42\text{-}60} \cdot di_{60}/dt -$$

$$M_{42\text{-}61} \cdot di_{61}/dt - M_{42\text{-}62} \cdot di_{62}/dt -$$

$$M_{42\text{-}63} \cdot di_{63}/dt - M_{42\text{-}64} \cdot di_{64}/dt \quad (10)$$

Equation 11

$$V_{43} = R_{43} \cdot i_{43} + L_{43} \cdot di_{43}/dt + M_{43\text{-}57} \cdot di_{57}/dt + M_{43\text{-}58} \cdot di_{58}/dt + M_{43\text{-}59} \cdot di_{59}/dt + M_{43\text{-}60} \cdot di_{60}/dt - M_{43\text{-}61} \cdot di_{61}/dt - M_{43\text{-}62} \cdot di_{62}/dt - M_{43\text{-}63} \cdot di_{63}/dt - M_{43\text{-}64} \cdot di_{64}/dt \quad (11)$$

Equation 12

$$V_{44} = R_{44} \cdot i_{44} + L_{44} \cdot di_{44}/dt + M_{44\text{-}57} \cdot di_{57}/dt + M_{44\text{-}58} \cdot di_{58}/dt + M_{44\text{-}59} \cdot di_{59}/dt + M_{44\text{-}60} \cdot di_{60}/dt - M_{44\text{-}61} \cdot di_{61}/dt - M_{44\text{-}62} \cdot di_{62}/dt - M_{44\text{-}63} \cdot di_{63}/dt - M_{44\text{-}64} \cdot di_{64}/dt \quad (12)$$

In Equations (9) to (12), V indicates voltage, R indicates resistance, (i) indicates current, L indicates self-inductance, M indicates mutual inductance, and $di/dt$ indicates a degree of temporal change in current (i).

In Equations (9) to (12), if the variations in the edgewise voltages in the Thyristers 11 to 14 of the U-phase arm and the variations in the characteristic constants of the connection conductors 41 to 44 are ignored, the voltage drop $V_{41}$ to $V_{44}$ is equal across the connection conductors 41 to 44.

In the configuration shown in FIG. 7(a), however, the mutual inductance M between each of the connection conductors 41 to 44 and each of the connection conductors 57 to 64 is inversely proportional to the distance between the conductors. Thus, in Equations (9) to (12), current $i_{44}$ flowing through the connection conductor 44 is larger than currents $i_{41}$, $i_{42}$, $i_{43}$ flowing through the connection conductors 41 to 43. Consequently, the current flowing through the Thyrister 14 is larger than the currents flowing through the Thyristers 11 to 13. These differences occur while each current is temporally varying ($di/dt \neq 0$).

In the conventional configuration of a main circuit of a rectifier used as a power-conversion apparatus, a current unbalance occurs among the multiple semiconductor devices constituting each arm.

Therefore, to eliminate this current unbalance, the number of semiconductor devices connected in parallel is increased, resulting in larger and more expensive power-conversion apparatuses.

In addition, as is well known, the magnitude of the edgewise voltage has been individually determined for each semiconductor device of a power-conversion apparatus in order to reduce current unbalance. Recent advancements in semiconductor fabrication technologies, however, have contributed to a reduction in variation in the edgewise voltages of the semiconductor devices. As a result, a large amount of time and labor are required for this operation.

It is an object of this invention to provide a power-conversion apparatus that solves these problems.

SUMMARY OF THE INVENTION

In a first aspect of the present invention, a power-conversion apparatus comprises a bridge circuit, each arm of which has multiple semiconductor devices connected in parallel, wherein the respective connection conductors extending from one AC side of the bridge circuit to the semiconductor devices of each arm are laid in such a way that mutual inductances between the connection conductors are substantially equal.

In a second aspect of the present invention, in the above power-conversion apparatus, the respective connection conductors extending from one AC side of the bridge circuit to the semiconductor devices of an upper arm of the bridge circuit, and the respective connection conductors extending from the other AC side of the bridge circuit to the semiconductor devices of a lower arm of the bridge circuit, are laid in such a way as to reduce the mutual inductance between the former and latter conductors.

In addition, in a third aspect of the present invention, in the above power-conversion apparatus, the respective connection conductors extending from one AC side of the bridge circuit to the semiconductor devices of an upper arm of the bridge circuit, and the respective connection conductors extending from the other AC side of the bridge circuit to the semiconductor devices of a lower arm of the bridge circuit, are laid in such a way that the former connection conductors are perpendicular to the latter connection conductors.

In addition, in a fourth aspect of the present invention, in the above power-conversion apparatus, the respective connection conductors extending from one AC side of the bridge circuit to the semiconductor devices of each arm are laid in such a way that the mutual inductances between the connection conductors are substantially equal. Also, the respective connection conductors extending from one AC side of the bridge circuit to the semiconductor devices of an upper arm of the bridge circuit, and the respective connection conductors extending from the other AC side of the bridge circuit to the semiconductor devices of a lower arm of the bridge circuit, are laid to reduce the mutual inductance between the former and latter connection conductors.

Furthermore, in a fifth aspect of the present invention, in above power-conversion apparatus, the respective connection conductors extending from one AC side of the bridge circuit to the semiconductor devices of each arm are laid in such a way that the mutual inductances between the connection conductors are substantially equal. Also, the respective connection conductors extending from one AC side of the bridge circuit to the semiconductor devices of an upper arm of the bridge circuit, and the respective connection conductors extending from the other AC side of the bridge circuit to the semiconductor devices of a lower arm of the bridge circuit, are laid in such a way that the former connection conductors are perpendicular to the latter connection conductors.

This invention substantially equalizes the mutual inductances between the respective connection conductors extending from the AC side of the bridge circuit to the multiple semiconductor devices of each arm, in order to improve the current balance among the devices, as described below. In addition, the mutual inductance between each connection conductor extending from one AC side of the bridge circuit to the semiconductor devices of the upper arm of the bridge circuit, and each connection conductor extending from the other AC side of the bridge circuit to the semiconductor devices of the lower arm of the bridge circuit, are reduced to improve the current balance among the devices, as described below.

DETAILED DESCRIPTION OF PREFERRED EMBODIMENTS

Figure 1A:
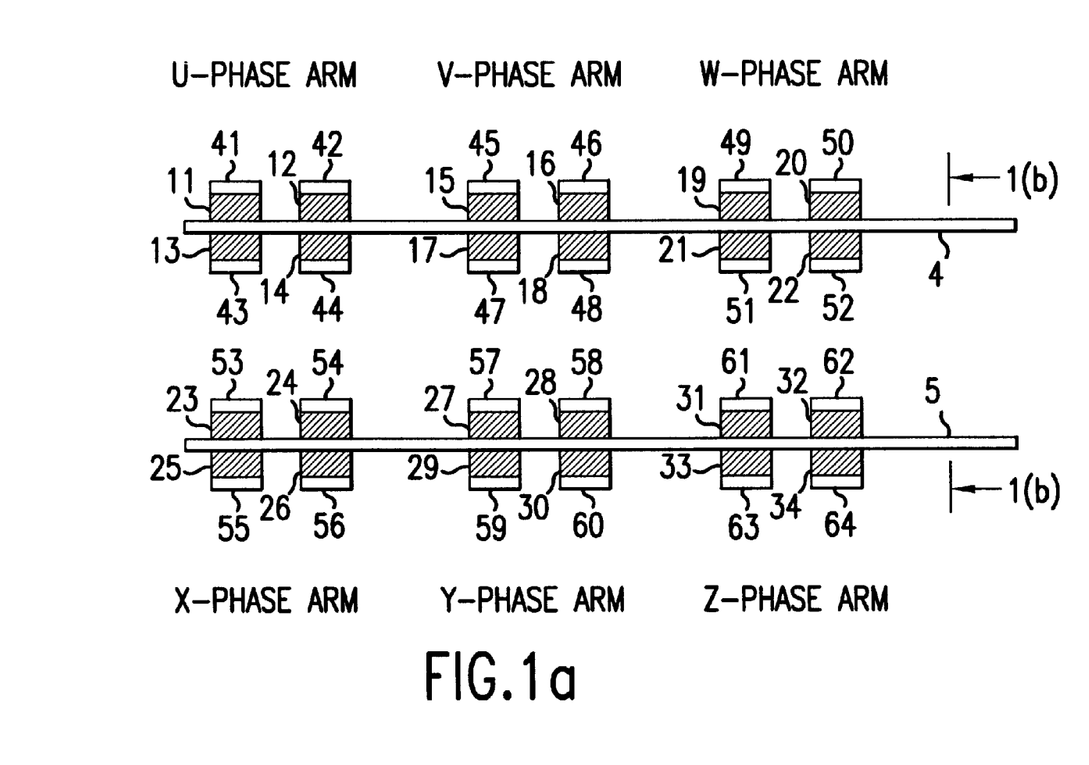
FIG. 1(a) is a typical conceptual block diagram of a power-conversion apparatus showing a first embodiment of this invention.
Figure 1B:
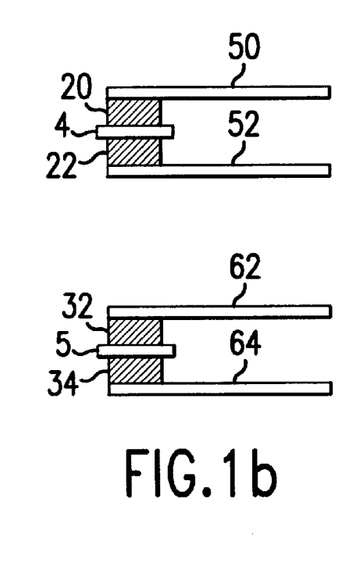
FIG. 1(b) is a cross sectional view take along line 1(b)—1(b) in FIG. 1(a)

FIGS. 1(a) and 1(b) are typical conceptual diagrams showing a first embodiment of this invention relating to the main circuit of the rectifier shown in FIG. 6. The components having the same functions as in the conventional configuration shown in FIGS. 7(a) and 7(b) have the same reference numerals, even though their shapes differ from those shown in FIGS. 7(a) and 7(b).

In the configuration shown in FIGS. 1(a) and 1(b), cathodes of Thyristers 11, 12, 15, 16, 19, 20 of each of U- to W-phase arms contact one surface of a bus 4 for a DC-side positive pole, and cathodes of Thyristers 13, 14, 17, 18, 21, 22 of each of the U- to W-phase arms contact the other surface of the bus 4 for the DC-side positive pole. Anodes of the Thyristers 11 to 22 are connected to one of the buses 1 to 3 (not shown) via connection conductors 41 to 52. In addition, anodes of Thyristers 23, 24, 27, 28, 31, 32 of each of X- to Z-phase arms contact one surface of a bus 5 for a DC-side negative pole that is opposed to the bus 4 for the DC-side positive pole, while anodes of Thyristers 25, 26, 29, 30, 33, 34 of each of the X- to Z-phase arms contact the other surface of the bus 5 for the DC-side negative pole. The cathodes of the Thyristers 23 to 34 are connected to one of the buses 1 to 3 (not shown) via connection conductors 53 to 64.

In the configuration shown in FIGS. 1(a) and 1(b), when, for example, the connection conductors 41 to 44 of the U-phase arm are arranged so that an interval between the connection conductors 41 and 42, an interval between the connection conductors 41 and 43, an interval between the connection conductors 43 and 44, and an interval between the connection conductors 42 and 44 are equal, then an interval between the connection conductors 41 and 44 and an interval between the connection conductors 42 and 43 are also equal, and the mutual inductances $M_{41-42}$, $M_{41-43}$, $M_{43-44}$, $M_{42-44}$ in Equations (1) to (4) have almost equal values. Similarly, the mutual inductances $M_{41-44}$, $M_{42-43}$ have almost equal values, so that while currents flowing through the Thyristers 11 to 14 are temporally varying ($di/dt \neq 0$), the differences among the respective currents are reduced. In particular, by equalizing the degree of temporal change (di/dt) in the currents flowing through the Thyristers 11 to 14, the respective current shares are almost balanced.

Figure 2A:
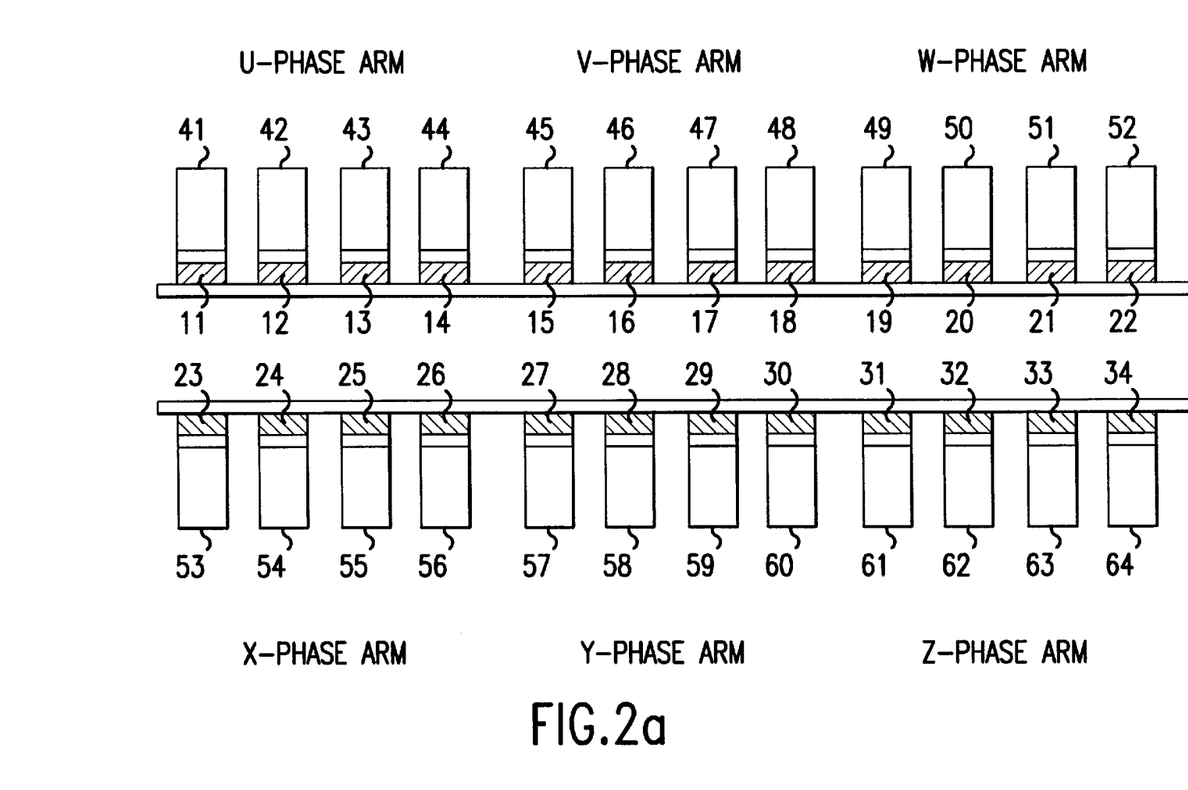
FIG. 2(a) is a typical conceptual block diagram of a power-conversion apparatus showing a second embodiment of this invention.
Figure 2B:
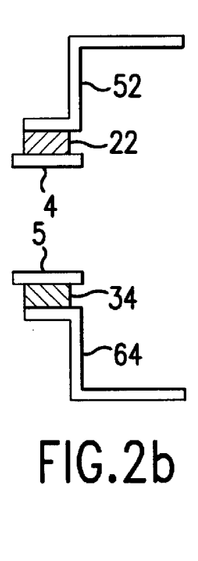
FIG. 2(b) is a cross sectional view take along line 2(b)—2(b) in FIG. 2(a)

FIGS. 2(a) and 2(b) are typical conceptual diagrams showing a second embodiment of this invention relating to the main circuit of the rectifier shown in FIG. 6. Components having the same functions as in the conventional configuration shown in FIGS. 7(a) and 7(b) have the same reference numerals, even though their shapes differ from those shown in FIGS. 7(a) and 7(b).

In the configuration shown in FIGS. 2(a) and 2(b), cathodes of Thyristers 11 to 22 of each of U- to W-phase arms contact one surface of a bus 4 for a DC-side positive pole, and anodes of the Thyristers 11 to 22 are connected to one of buses 1 to 3 (not shown) via connection conductors 41 to 52 bent in a step form as shown in the figure. In addition, anodes of Thyristers 23 to 34 of each of X- to Z-phase arms contact one surface of a bus 5 for a DC-side negative pole that forms the back of the surface positioned opposite to the bus 4 for a DC-side positive pole, and cathodes of the Thyristers 23 to 34 are connected to one of the buses 1 to 3 (not shown) via connection conductors 53 to 64 bent in a step form as shown in the figure. As shown in FIG. 2(a), the Thyristers 11 to 22 are linearly arranged on one surface of the bus 4, while the Thyristers 23 to 34 are linearly arranged on one surface of the bus 5.

In the configuration shown in FIGS. 2(a) and 2(b), the connection conductors 41 to 44 of the U-phase arm and the connection conductors 57 to 60 of the Y-phase arm are discussed as an example. As is apparent from the cross section shown in FIG. 2(b), which is taken along line 2(b)—2(b) in FIG. 2(a), by arranging the connection conductors 41 to 44 and the connection conductors 57 to 60 in such a way that the intervals between the former and latter conductors are increased in the available areas, the mutual inductances $M_{41-57}$, $M_{41-58}$, $M_{41-59}$, $M_{41-60}$, $M_{42-57}$, $M_{42-58}$, $M_{42-59}$, $M_{42-60}$, $M_{43-57}$, $M_{43-58}$, $M_{43-59}$, $M_{43-60}$, $M_{44-57}$, $M_{44-58}$, $M_{44-59}$, $M_{44-60}$ in Equations (5) to (8) can be reduced in order to reduce the adverse effects of the current flowing through the Y-phase arm.

Similarly, the mutual inductances $M_{41-61}$, $M_{41-62}$, $M_{41-63}$, $M_{41-64}$, $M_{42-61}$, $M_{42-62}$, $M_{42-63}$, $M_{42-64}$, $M_{43-61}$, $M_{43-62}$, $M_{43-63}$, $M_{43-64}$, $M_{44-61}$, $M_{44-62}$, $M_{44-63}$, $M_{44-64}$ in Equations (9) to (12) can be reduced in order to reduce the adverse effects of the current flowing through the Z-phase arm.

Figure 3A:
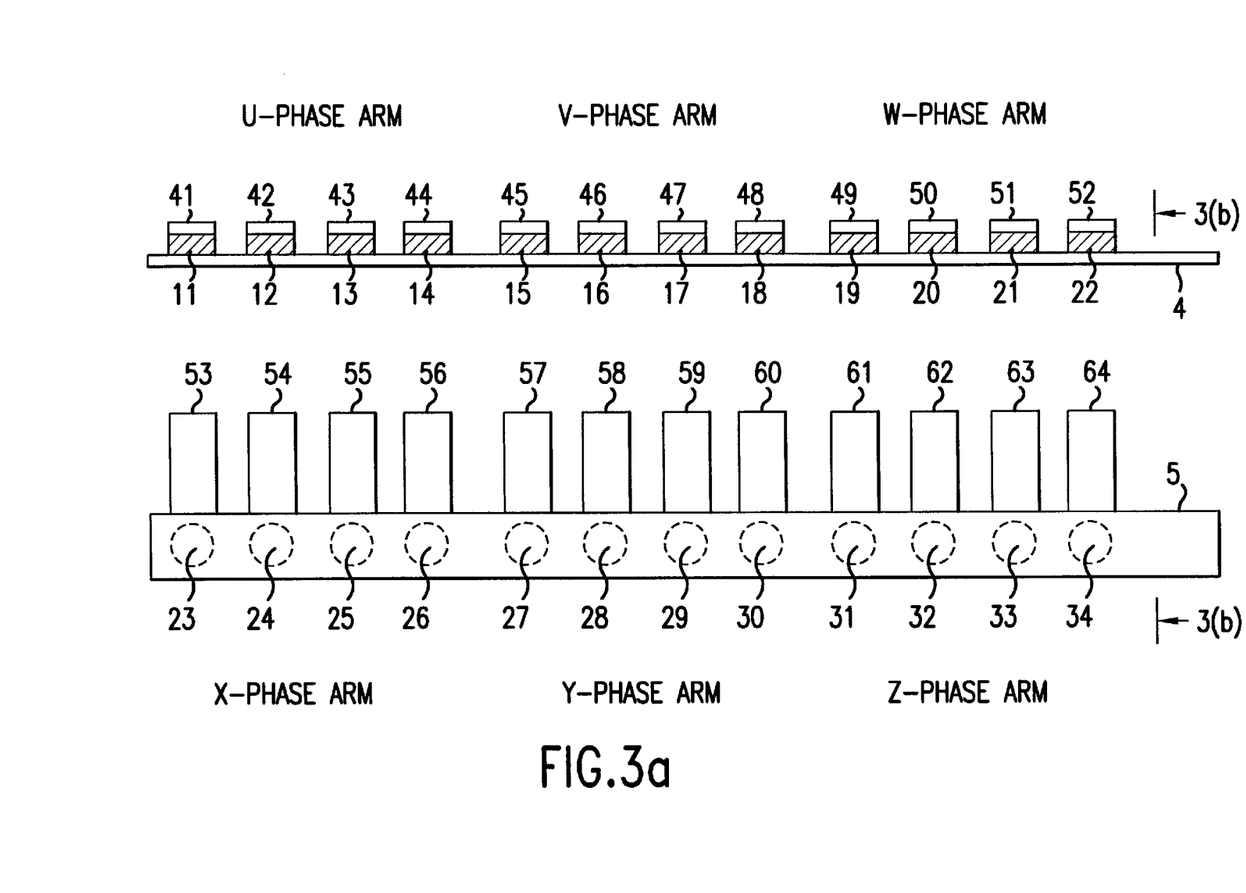
FIG. 3(a) is a typical conceptual block diagram of a power-conversion apparatus showing a third embodiment of this invention.
Figure 3B:
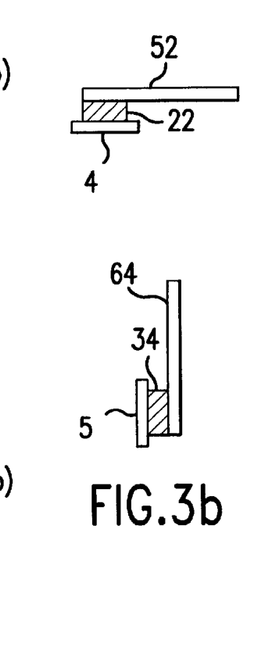
FIG. 3(b) is a cross sectional view take along line 3(b)—3(b) in FIG. 3(a)

FIGS. 3(a) and 3(b) are typical conceptual diagrams showing a third embodiment of this invention relating to the main circuit of the rectifier shown in FIG. 6. Components having the same functions as in the conventional configuration shown in FIGS. 7(a) and 7(b) have the same reference numerals, even though their shapes differ from those shown in FIGS. 7(a) and 7(b).

In the configuration in FIGS. 3(a) and 3(b), cathodes of Thyristers 11 to 22 of each of U- to W-phase arms contact one surface of a bus 4 for a DC-side positive pole, and anodes of the Thyristers 11 to 22 are connected to one of buses 1 to 3 (not shown) via connection conductors 41 to 52. In addition, anodes of Thyristers 23 to 34 of each of X- to Z-phase arms contact a mounting surface of a bus 5 for a DC-side negative pole positioned perpendicularly to the mounting surface of the bus 4 for the DC-side positive pole, and cathodes of each of the Thyristers 23 to 34 are connected to one of the buses 1 to 3 (not shown) via connection conductors 53 to 64. As shown in FIG. 3(a), the Thyristers 11 to 22 are linearly arranged on one surface of the bus 4, while the Thyristers 23 to 34 are linearly arranged on one surface of the bus 5.

In the configuration shown in FIGS. 3(a) and 3(b), for example, the connection conductors 41 to 44 of the U-phase arm and the connection conductors 57 to 60 of the Y-phase arm are arranged perpendicularly to each other in order to nearly zero the mutual inductances $M_{41-57}$, $M_{41-58}$, $M_{41-59}$, $M_{41-60}$, $M_{42-57}$, $M_{42-58}$, $M_{42-59}$, $M_{42-60}$, $M_{43-57}$, $M_{43-58}$, $M_{43-59}$, $M_{43-60}$, $M_{44-57}$, $M_{44-58}$, $M_{44-59}$, $M_{44-60}$ in Equations (5) to (8), thereby reducing the adverse effects of the current flowing through the Y-phase arm.

Similarly, the mutual inductances $M_{41-61}$, $M_{41-62}$, $M_{41-63}$, $M_{41-64}$, $M_{42-61}$, $M_{42-62}$, $M_{42-63}$, $M_{42-64}$, $M_{43-61}$, $M_{43-62}$, $M_{43-63}$, $M_{43-64}$, $M_{44-61}$, $M_{44-62}$, $M_{44-63}$, $M_{44-46}$ in Equations (9) to (12), can almost be made to zero in order to reduce the adverse effects of the current flowing through the Z-phase arm.

Figure 4A:
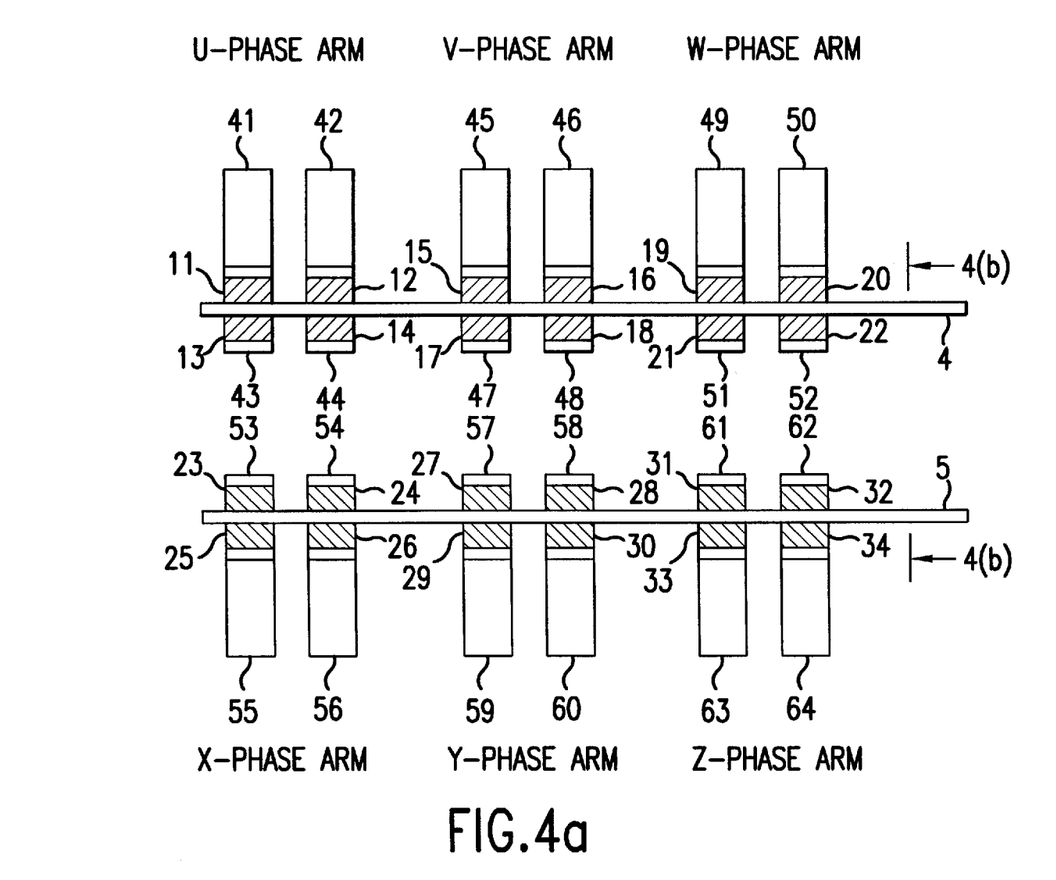
FIG. 4(a) is a typical conceptual block diagram of a power-conversion apparatus showing a fourth embodiment of this invention.
Figure 4B:
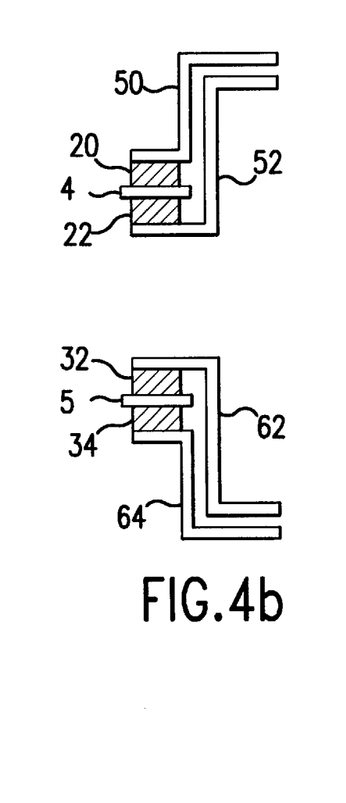
FIG. 4(b) is a cross sectional view take along line 4(b)—4(b) in FIG. 4(a)

FIGS. 4(a) and 4(b) are typical conceptual diagrams showing a fourth embodiment of this invention relating to the main circuit of the rectifier shown in FIG. 6. Components having the same functions as in the conventional configuration shown in FIGS. 7(a) and 7(b) have the same reference numerals, even though their shapes differ from those shown in FIGS. 7(a) and 7(b).

In the configuration in FIGS. 4(a) and 4(b), cathodes of Thyristers 11, 12, 15, 16, 19, 20 of each of U- to W-phase arms contact one surface of a bus 4 for a DC-side positive pole, and cathodes of Thyristers 13, 14, 17, 18, 21, 22 of each of the U- to W-phase arms contact the other surface of the bus 4 for the DC-side positive pole. Anodes of the Thyristers 11 to 22 are connected to one of buses 1 to 3 (not shown) via connection conductors 41 to 52 bent in a step form as shown in the figure. In addition, anodes of Thyristers 23, 24, 27, 28, 31, 32 of each of X- to Z-phase arms contact one surface of a bus 5 for a DC-side negative pole that is opposed to the bus 4 for the DC-side positive pole, while anodes of Thyristers 25, 26, 29, 30, 33, 34 of the X- to Z-phase arms contact the other surface of the bus 5 for the DC-side negative pole. The cathodes of the Thyristers 23 to 34 are connected to one of the buses 1 to 3 (not shown) via connection conductors 53 to 64 bent in a step form as shown in the figure.

In the configuration shown in FIG. 4(a) and 4(b), for example, the connection conductors 41 to 44 of the U-phase arm are arranged so that an interval between the connection conductors 41 and 42, an interval between the connection conductors 41 and 43, an interval between the connection conductors 43 and 44, and an interval between the connection conductors 42 and 44 are equal. In addition, as shown by the cross section in FIG. 4(b) taken along line 4(b)—4(b) in FIG. 4(a), for example, the connection conductors 41 to 44 of the U-phase arm and the connection conductors 57 to 60 of the Y-phase arm are arranged in such a way as to increase the intervals between the former and latter conductors in the available areas. Furthermore, as shown by the cross section in FIG. 4(b), for example, the connection conductors 41 to 44 of the U-phase arm and the connection conductors 61 to 64 of the Z-phase arm are arranged in such a way as to increase the intervals between the former and latter connection conductors in the available areas. Thus, all the mutual inductances in Equations (1) to (12) can be reduced.

Figure 5A:
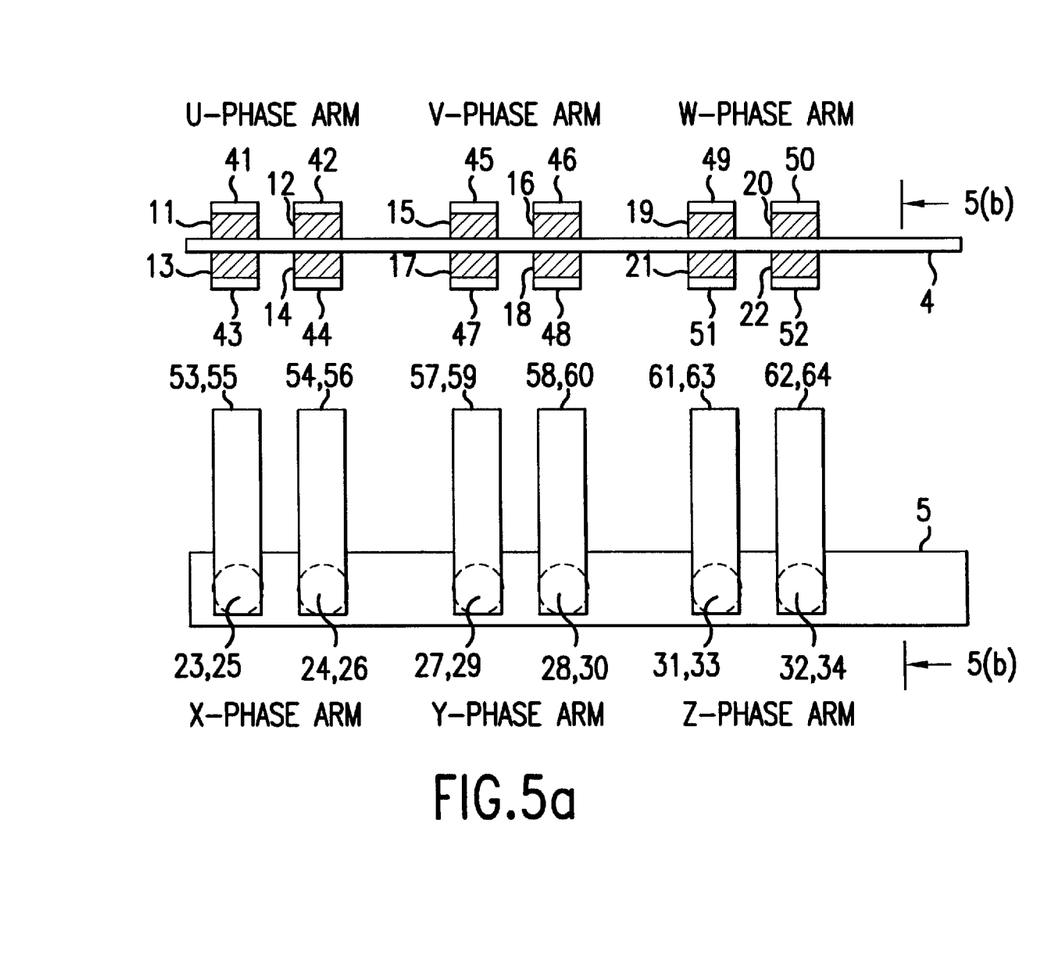
FIG. 5(a) is a typical conceptual block diagram of a power-conversion apparatus showing a fifth embodiment of this invention.
Figure 5B:
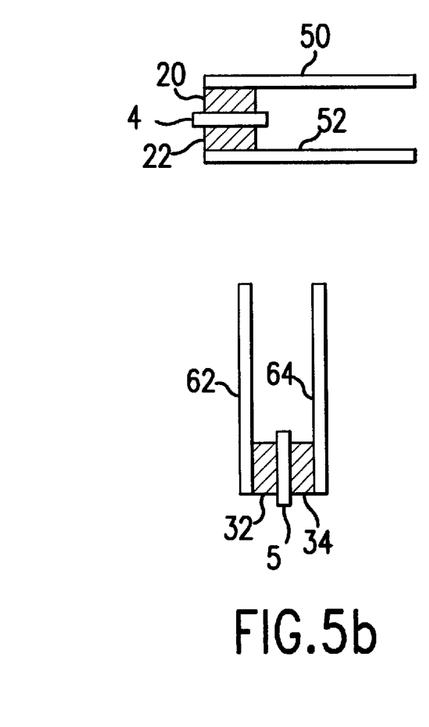
FIG. 5(b) is a cross sectional view take along line 5(b)—5(b) in FIG. 5(a)

FIGS. 5(a) and 5(b) are typical conceptual diagrams showing a fifth embodiment of this invention relating to the main circuit of the rectifier shown in FIG. 6. Components having the same functions as in the conventional configuration shown in FIGS. 7(a) and 7(b) have the same reference numerals, even though their shapes differ from those shown in FIGS. 7(a) and 7(b).

In the configuration shown in FIG. 5(a), cathodes of Thyristers 11, 12, 15, 16, 19, 20 of each of U- to W-phase arms contact one surface of a bus 4 for a DC-side positive pole, and cathodes of Thyristers 13, 14, 17, 18, 21, 22 of each of the U- to W-phase arms contact the other surface of the bus 4 for the DC-side positive pole. Anodes of the Thyristers 11 to 22 are connected to one of buses 1 to 3 (not shown) via connection conductors 41 to 52. In addition, anodes of Thyristers 23, 24, 27, 28, 31, 32 of each of X- to Z-phase arms contact one surface of a bus 5 for a DC-side negative pole positioned perpendicularly to the mounting surface of the bus 4 for the DC-side positive pole, as shown in the figure, while anodes of Thyristers 25, 26, 29, 30, 33, 34 of each of the X- to Z-phase arms contact the other surface of the bus 5 for the DC-side negative pole. The cathodes of the Thyristers 23 to 34 are connected to one of the buses 1 to 3 (not shown) via connection conductors 53 to 64.

In the configuration shown in FIGS. 5(a) and 5(b), mutual inductances between the respective connection conductors in Equations (1) to (4) are almost equalized by arranging, for example, the connection conductors 41 to 44 of the U-phase so that an interval between the connection conductors 41 and 42, an interval between the connection conductors 41 and 43, an interval between the connection conductors 43 and 44, and an interval between the connection conductors 42 and 44 are equal. In addition, the mutual inductances in Equations (5) to (12) are almost zeroed by positioning, for example, the connection conductors 41 to 44 of the U-phase arm and the connection conductors 57 to 60 of the Y-phase arm perpendicularly to each other, and further positioning, for example, the connection conductors 41 to 44 of the U-phase arm and the connection conductors 61 to 64 of the Z-phase arm perpendicularly to each other.

This invention almost equalizes the mutual inductances between the respective connection conductors from the AC side of the bridge circuit to the multiple semiconductor devices of each arm in order to improve the current balance among the devices. In addition, the mutual inductance between each connection conductor from one AC side of the bridge circuit to the semiconductor devices of the upper arm of the bridge circuit, and each connection conductor from the other AC side of the bridge circuit to the semiconductor devices of the lower arm of the bridge circuit, are reduced in order to improve the current balance among the devices, thereby providing smaller and less expensive power-conversion apparatuses, and eliminating the need for complicated operations for individually determining the magnitude of the edgewise voltage for each semiconductor device, as in the prior art.

In addition, operation tests in a factory for a high-capacity rectifier used for an electrolytic cell facility are generally conducted at a current of a rated value with a low output voltage, and this current waveform differs from the current waveform produced during actual operations. Consequently, the conventional configuration requires an operation for balancing the current at an installation site. The configuration according to this invention, however, can eliminate the need for such an operation.

What is claimed is:

1. A power-conversion apparatus comprising:
   a bridge circuit having arms, each arm having multiple semiconductor devices connected in parallel,
   buses connected to positive and negative poles of a DC side, said multiple semiconductor devices in one arm being arranged on one of the buses such that the semiconductor devices are located on both sides of said one of the buses to face each other, and situated side by side on each side of said one of the buses, and
   connection conductors connected to the respective arms extending from one AC side of the bridge circuit to the semiconductor devices, said connection conductors being arranged such that mutual inductances between the connection conductors in said each arm are substantially equal.

2. A power-conversion apparatus according to claim 1, wherein said connection conductors include first connection conductors extending from the one AC side to semiconductor devices of an upper arm of the bridge circuit, and second connection conductors extending from the other AC side to semiconductor devices of a lower arm of the bridge circuit, said first and second connection conductors being arranged to reduce mutual inductance therebetween.

3. A power-conversion apparatus according to claim 1, wherein said connection conductors include first connection conductors extending from the one AC side to semiconductor devices of an upper arm of the bridge circuit, and second connection conductors extending from the other AC side to semiconductor devices of a lower arm of the bridge circuit, said first and second connection conductors being arranged such that the first connection conductors are perpendicular to the second connection conductors.

4. A power-conversion apparatus comprising:
   a bridge circuit having upper and lower arms, each arm having multiple semiconductor devices connected in parallel, and
   connection conductors including first connection conductors extending from one AC side of the bridge circuit to the semiconductor devices of the upper arm of the bridge circuit and bent in one direction, and second connection conductors extending from the other AC side to the semiconductor devices of the lower arm of the bridge circuit and bent in a direction opposite to the one direction, said first and second connection conductors being arranged to reduce mutual inductance therebetween.

5. A power-conversion apparatus comprising:
   a bridge circuit having upper and lower arms, each arm having multiple semiconductor devices connected in parallel,
   a first bus connected to the semiconductor devices of the upper arm and extending to a DC side,
   a second bus connected to the semiconductor devices of the lower arm and extending to the DC side, and
   connection conductors including first connection conductors extending from one AC side of the bridge circuit to the semiconductor devices of the upper arm of the bridge circuit connected to the first bus, and second connection conductors extending from the other AC side to the semiconductor devices of the lower arm of the bridge circuit connected to the second bus, said first connection conductors being arranged parallel to the first bus and said second connection conductors being arranged parallel to the second bus, said first connection conductors and the first bus being disposed perpendicular to the second connection conductors and the second bus.

6. A power-conversion apparatus according to claim 1, wherein the distance between said connection conductors situated side by side in each side of said one arm is equal respectively, and the distance between said connection conductors facing each other in said one arm is equal respectively.

7. A power-conversion apparatus according to claim 4, wherein said first and second connection conductors are arranged side by side.

8. A power-conversion apparatus according to claim 4, further comprising a first bus connected to the semiconductor devices of the upper arm, and a second bus connected to the semiconductor devices of the lower arm, said semiconductor devices of each of the upper and lower arms being arranged on both sides of each of the buses to face each other, respectively.

9. A power-conversion apparatus according to claim 5, wherein said first and second connection conductors are arranged side by side, respectively.

10. A power-conversion apparatus according to claim 5, wherein said semiconductors of the upper arm are arranged on both sides of the first bus to face each other and situated side by side on each side, and said semiconductors of the lower arm are arranged on both sides of the second bus to face each other and situated side by side on each side, the distances between the connection conductors situated side by side in each of the upper and lower arms being equal, respectively, and the distances between the connection conductors facing each other in each of the upper and lower arms being equal, respectively.

* * * * *

UNITED STATES PATENT AND TRADEMARK OFFICE
CERTIFICATE OF CORRECTION

PATENT NO. : 6,111,771  
DATED : August 29, 2000  
INVENTOR(S) : Koji Hino

Page 1 of 1

It is certified that error appears in the above-identified patent and that said Letters Patent is hereby corrected as shown below:

Column 1,
Line 27, change "a X-phase" to -- an X-phase --

Column 5,
Lines 19, 25, 30, 36 and 41, change "take" to -- taken --, respectively;

Column 7,
Line 36, before "$M_{43-62}$" add -- $M_{43-61}$, --; and
Line 37, change "$M_{44-46}$" to -- $M_{44-64}$ --

Signed and Sealed this

Twenty-fifth Day of September, 2001

Attest:

*Nicholas P. Godici*

*Attesting Officer*

NICHOLAS P. GODICI
*Acting Director of the United States Patent and Trademark Office*